United States Patent
Ochiai et al.

(10) Patent No.: US 12,240,966 B2
(45) Date of Patent: Mar. 4, 2025

(54) CELLULOSE FIBER COMPOSITE RECYCLED RESIN AND PRODUCTION METHOD THEREFOR

(71) Applicant: DAIO PAPER CORPORATION, Ehime (JP)

(72) Inventors: Yu Ochiai, Ehime (JP); Ikko Matsusue, Ehime (JP); Junya Okawa, Ehime (JP)

(73) Assignee: Daio Paper Corporation, Ehime (JP)

( * ) Notice: Subject to any disclaimer, the term of this patent is extended or adjusted under 35 U.S.C. 154(b) by 593 days.

(21) Appl. No.: 17/607,578

(22) PCT Filed: Jun. 23, 2020

(86) PCT No.: PCT/JP2020/024516
§ 371 (c)(1),
(2) Date: Oct. 29, 2021

(87) PCT Pub. No.: WO2020/262344
PCT Pub. Date: Dec. 30, 2020

(65) Prior Publication Data
US 2022/0204739 A1    Jun. 30, 2022

(30) Foreign Application Priority Data
Jun. 28, 2019 (JP) .................... 2019-120698

(51) Int. Cl.
*C08G 18/00* (2006.01)
*C08J 3/00* (2006.01)
*C08J 3/20* (2006.01)
*C08L 23/12* (2006.01)

(52) U.S. Cl.
CPC .......... *C08L 23/12* (2013.01); *C08J 3/005* (2013.01); *C08J 3/203* (2013.01); *C08J 2323/12* (2013.01); *C08J 2401/02* (2013.01); *C08J 2423/12* (2013.01); *C08L 2205/025* (2013.01); *C08L 2205/035* (2013.01); *C08L 2205/16* (2013.01); *C08L 2207/20* (2013.01)

(58) Field of Classification Search
USPC ............................................. 521/47
See application file for complete search history.

(56) References Cited

FOREIGN PATENT DOCUMENTS

| JP | 2002-059425 | 2/2002 | |
|---|---|---|---|
| JP | 4409923 | 2/2010 | |
| JP | 2016-094538 | 5/2016 | |
| JP | 2017-002138 | 1/2017 | |
| JP | 2017-071676 | 4/2017 | |
| JP | 2017-101184 | 6/2017 | |
| JP | 2017-105983 | 6/2017 | |
| JP | 2019-052307 | 4/2019 | |
| JP | 2019052307 A * | 4/2019 | ............... C08L 1/10 |
| JP | 2020-193263 | 12/2020 | |
| WO | 2019/039570 | 2/2019 | |
| WO | 2019/221029 | 11/2019 | |

OTHER PUBLICATIONS

JP-2019052307 Machine Translation (Year: 2019).*
High-density polyethylene Novatec HD product information, Mitsubishi Chemical Corporation, Oct. 11, 2012 https://www.m-chemical.co.jp/products/departments/group/jpe/product/1200016_7016.html.
"Low-density polyethylene Novatec LD product information, Mitsubishi Chemical Corporation, Oct. 11, 2012https://www.m-chemical.co.jp/products/departments/group/jpe/product/1200019_7016.html"
International Search Report for PCT/JP2020/024516, dated Aug. 25, 2020.

* cited by examiner

*Primary Examiner* — Terressa Boykin
(74) *Attorney, Agent, or Firm* — Andrus Intellectual Property Law, LLP

(57) ABSTRACT

A cellulose fiber composite recycled resin having excellent strength, and a method for producing the same. The cellulose fiber composite recycled resin contains a recycled resin and a mixture of fibrous cellulose, at least one of resin powders and resin pellets, and at least one substance selected from the group consisting of phthalic acid, phthalates, derivatives of phthalic acid, and derivatives of phthalates. For producing this composite resin, at least one of resin powders and resin pellets are added to a slurry of cellulose fibers to obtain a first mixture, a recycled resin is mixed into the first mixture to obtain a second mixture, and the second mixture is kneaded, wherein part or all of the cellulose fibers are fine fibers.

16 Claims, No Drawings

CELLULOSE FIBER COMPOSITE RECYCLED RESIN AND PRODUCTION METHOD THEREFOR

CROSS-REFERENCE TO RELATED APPLICATIONS

This application is the U.S. national stage application of International Application PCT/JP2020/024516, filed Jun. 23, 2020, which international application was published on Dec. 30, 2020, as International Publication WO 2020/262344 in the Japanese language. The International Application claims priority of Japanese Patent Application No. 2019-120698, filed Jun. 28, 2019. The international application and Japanese application are both incorporated herein by reference, in entirety.

TECHNICAL FIELD

The present invention relates to a cellulose fiber composite recycled resin and a method for producing the same.

BACKGROUND ART

Cellulose nanofibers are usually available in the form of a dispersion (slurry), in which state the transportation cost is high. In business, it is economical to dry a dispersion of cellulose nanofibers and transport the dried product. Drying the dispersion, however, causes bonding among cellulose nanofibers, resulting in firm aggregation. The cellulose nanofibers are thus difficult to be redispersed in water and cannot be dispersed as they were before the drying.

Against this background, the present inventors, aiming at improved redispersibility of cellulose nanofibers, proposed use of hydroxy acids (see Patent Literature 1) and use of glycerin or derivatives thereof (see Patent Literature 2). According to these proposals, redispersibility of cellulose nanofibers improves sufficiently.

On the other hand, fine fibers like cellulose nanofibers and microfiber cellulose have recently been attracting attention for use as a reinforcing material for resins.

Further, due to recently increasing concerns about environmental problems, recycling of resins is desired for effective use of resources. However, resins that have been recycled (recycled resins) decline in quality, such as strength, due to UV rays or time-dependent deterioration, so that the effective use may not be fully achieved. In view of this, the present inventors have conducted various tests on the fine fibers dried in accordance with the above proposals, for their properties as a reinforcing material for recycled resins. In the course of these tests, it has been revealed that cellulose fiber composite recycled resins obtained from the dried products according to the above proposals have room for improvement in strength.

CITATION LIST

Patent Literature

Patent Literature 1: JP 2017-002138 A
Patent Literature 2: JP 2017-101184 A
Patent Literature 3: JP 2002-059425 A
Patent Literature 4: JP 4409923 B

SUMMARY OF INVENTION

Problem to be Solved by the Invention

It is a primary object of the present invention to provide a cellulose fiber composite recycled resin having excellent strength as well as a method for producing the same.

Means for Solving the Problem

The present inventors have found out, in their various experiments, that the dried products proposed in Patent Literatures 1 and 2 redisperse well in water, but disperse poorly in resins. This is revealed to be one of the factors that prevents the dried products (cellulose nanofibers, microfiber cellulose, or the like) mixed in a resin from improving the strength of the resin as much as expected. In this regard, it is conceivable to first disperse the dried product in water and then mix the obtained dispersion with a resin, but evaporating the moisture contained in the cellulose nanofibers or the like during their mixing with the resin is extremely thermally inefficient. In view of the above, the present inventors have reached the following aspects.

(First Aspect)

A method for producing a cellulose fiber composite recycled resin, including:
mixing at least one of resin powders and resin pellets into a slurry of cellulose fibers to obtain a first mixture, and
kneading the first mixture with a recycled resin,
wherein part or all of the cellulose fibers are fine fibers.

Conventionally, for the purpose of enhancing the strength of a recycled resin, fine fibers were kneaded with the recycled resin to produce a cellulose fiber composite recycled resin, which, though, did not exhibit a sufficient strength. The present inventors assume that the reason for the fine fibers not imparting sufficient strength is as follows.

Cellulose fibers per se construct three-dimensional networks among them to produce stress (elastic force) against external force. Unless the cellulose fibers are sufficiently dispersed and mixed with the overall recycled resin, mere kneading of the cellulose fibers with the recycled resin may result in unevenness between the portion wherein the recycled resin and the cellulose fibers are sufficiently mixed and the portion wherein these two are not sufficiently mixed. The reason for this unevenness is not exactly known, but it is assumed that the cellulose fibers are aggregated during mixing with the recycled resin, and are not uniformly dispersed in the recycled resin. In the portion wherein the cellulose fibers and the recycled resin are not sufficiently mixed, the three-dimensional networks of the cellulose fibers are not sufficiently interposed in the recycled resin, resulting in insufficient strength of the cellulose fiber composite recycled resin.

In view of this, for the purpose of improving the dispersibility of cellulose fibers, at least one of resin powders and resin pellets are mixed in a slurry of cellulose fibers. By this mixing, the cellulose fibers adhere to the majority of the resin, which improves the dispersibility of the cellulose fibers. The present inventors presume that, in the product of kneading of this mixture and a recycled resin, numerous three-dimensional network structures formed by the appropriately dispersed cellulose fibers are interposed in the recycled resin to enhance the strength.

As a method for enhancing the strength of a recycled resin, there are known a method for controlling strength deterioration by mixing a fresh resin into a spent resin and molding the resulting mixture to form a recycled resin (Patent Literature 3), and a method for controlling strength deterioration by adding a rubber-based polymer and an inorganic filler to a spent resin and molding the resulting mixture to form a recycled resin (Patent Literature 4). These methods differ from the present invention in the absence of the cellulose fibers.

(Second Aspect)

A method for producing a cellulose fiber composite recycled resin, including:
  mixing at least one of resin powders and resin pellets into a slurry of cellulose fibers to obtain a first mixture,
  mixing a recycled resin into the first mixture to obtain a second mixture, and
  kneading the second mixture,
  wherein part or all of the cellulose fibers are fine fibers.

(Third Aspect)

There is an aspect in addition to the first or second aspect, wherein, with respect to 50 parts by mass of the recycled resin, the at least one of the resin powders and the resin pellets amount to more than 0 parts by mass and 100 parts by mass or less.

(Fourth Aspect)

There is an aspect in addition to the first or second aspect, wherein the resin powders have an average particle size of 1 to 1500 μm.

(Fifth Aspect)

There is an aspect in addition to the first or second aspect, wherein the resin pellets have an average particle size of 1 to 10 mm.

(Sixth Aspect)

There is an aspect in addition to the first or second aspect, wherein a component of the at least one of the resin powders and the resin pellets are the same as a component of the recycled resin.

(Seventh Aspect)

There is an aspect in addition to the first or second aspect, further including mixing at least one substance selected from the group consisting of polybasic acids, polybasic acid salts, derivatives of polybasic acids, and derivatives of polybasic acid salts into the slurry.

(Eighth Aspect)

There is an aspect in addition to the first or second aspect, further including mixing at least one substance selected from the group consisting of phthalic acid, phthalates, derivatives of phthalic acid, and derivatives of phthalates into the slurry.

(Ninth Aspect)

There is an aspect in addition to the first aspect, wherein the kneading of the first mixture with the recycled resin follows drying and grinding of the first mixture into a powdered product.

(Tenth Aspect)

A cellulose fiber composite recycled resin, containing:
  a recycled resin, and
  a mixture of
    microfiber cellulose having an average fiber length of 0.02 to 3 mm,
    at least one of resin powders and resin pellets, and
    at least one substance selected from the group consisting of phthalic acid, phthalates, derivatives of phthalic acid, and derivatives of phthalates.

Effect of the Invention

According to the present invention, there are provided a cellulose fiber composite recycled resin having excellent strength, and a method for producing a cellulose fiber composite recycled resin having excellent strength.

DESCRIPTION OF EMBODIMENTS

Next, embodiments for carrying out the invention are discussed. Note that the embodiments to be discussed are merely examples of the present invention. The scope of the present invention is not limited by the scope of the present embodiments.

The cellulose fiber composite recycled resin according to the present embodiment contains a recycled resin and a mixture of cellulose fibers and resin powders. The cellulose fibers are a mixture of fine fibers, such as, for example, cellulose nanofibers (CNF) and microfiber cellulose (MFC).

The resin powders may be powders of a virgin resin (non-recycled resin, raw resin, or fresh resin). The average particle size of the resin powders may be 1 to 1500 μm, more preferably 100 to 1000 μm. With the average particle size of the resin powders falling within this range, a suitable strength is imparted to the resulting product. With the average particle size below this range, the resin powders are too small with respect to the cellulose fibers, and sufficient dispersion of the fine fibers is not expected to be achieved.

The resin pellets may be pellets of a virgin resin. The average particle size of the resin pellets may be 1 to 10 mm, more preferably 1 to 5 mm. With the average particle size of the resin pellets falling within this range, a desired strength is imparted to the resulting product. With the average particle size over this range, sufficient dispersion of the fine fibers is not expected to be achieved.

A recycled resin refers to a resin produced from a spent resin. As a recycled resin, resins obtained by reproduction processing discarded resin materials may be used. The number of the reproduction processing is not particularly limited, and either once or a plurality of times. In general, recycled resins have inferior mechanical properties compared to virgin resins. This is said to be because repeated grinding and molding cause thermal history, physical impact, UV reaction, hydrolytic reaction, or the like, which reduces the molecular weight and thus the strength of the resins. The present technique may improve strength properties of recycled resins even containing not only polypropylene, but also polyethylene, polystyrene, polyvinyl chloride, polyester, or the like. The recycled resin may preferably be sorted out into a single resin, more preferably polypropylene recycled resins.

The cellulose fiber composite recycled resin may be obtained, for example, by mixing the resin powders to a slurry of the cellulose fibers to obtain a mixture, and kneading the mixture with a recycled resin. Prior to the kneading with the recycled resin, the mixture may be dried and ground into a powdered product. The details are discussed below.

(Cellulose Nanofibers)

According to the present embodiment, part or all of the cellulose fibers are fine fibers. The fine fibers contain at least one of cellulose nanofibers and microfiber cellulose, preferably microfiber cellulose.

The cellulose nanofibers play a role to significantly improve the strength of a recycled resin. The cellulose nanofibers may be obtained by defibrating (making finer) raw material pulp.

As the raw material pulp for cellulose nanofibers, one or more members may be selected and used from the group consisting of, for example, wood pulp made from hardwood, softwood, or the like; non-wood pulp made from straw, bagasse, cotton, hemp, bast fibers, or the like; and de-inked pulp (DIP) made from recovered used paper, waste paper, or the like. These various raw materials may be in the form of a ground product (powdered product), such as those referred to as cellulose-based powder.

In this regard, however, the raw material pulp for cellulose nanofibers is preferably wood pulp in order to avoid contamination of impurities as much as possible. As the wood pulp, one or more members may be selected and used from the group consisting of, for example, chemical pulp, such as hardwood kraft pulp (LKP) and softwood kraft pulp (NKP), and mechanical pulp (TMP).

The hardwood kraft pulp may be hardwood bleached kraft pulp, hardwood unbleached kraft pulp, or hardwood semi-bleached kraft pulp. Similarly, the softwood kraft pulp may be softwood bleached kraft pulp, softwood unbleached kraft pulp, or softwood semi-bleached kraft pulp.

As the mechanical pulp, one or more members may be selected and used from the group consisting of, for example, stone ground pulp (SGP), pressurized stone ground pulp (PGW), refiner ground pulp (RGP), chemi-ground pulp (CGP), thermo-ground pulp (TGP), ground pulp (GP), thermomechanical pulp (TMP), chemithermomechanical pulp (CTMP), refiner mechanical pulp (RMP), and bleached thermomechanical pulp (BTMP).

The raw material pulp may be pretreated by a chemical method prior to defibration. Such pretreatment by a chemical method may be, for example, hydrolysis of polysaccharides with acid (acid treatment), hydrolysis of polysaccharides with enzyme (enzyme treatment), swelling of polysaccharides with alkali (alkali treatment), oxidation of polysaccharides with an oxidizing agent (oxidation treatment), or reduction of polysaccharides with a reducing agent (reduction treatment).

An alkali treatment prior to the defibration causes partial dissociation of hydroxyl groups in hemicellulose or cellulose in the pulp, resulting in anionization of the molecules, which weakens intra- and intermolecular hydrogen bonds to promote dispersion of cellulose fibers during the defibration.

As the alkali used in the alkali treatment, for example, sodium hydroxide, lithium hydroxide, potassium hydroxide, an aqueous ammonia solution, or organic alkali, such as tetramethylammonium hydroxide, tetraethylammonium hydroxide, tetrabutylammonium hydroxide, and benzyltrimethylammonium hydroxide may be used. In view of the manufacturing cost, sodium hydroxide is preferably used.

The enzyme treatment, acid treatment, or oxidation treatment prior to the defibration may result in a low water retention degree, high degree of crystallinity, and also high homogeneity of the cellulose nanofibers. In this regard, cellulose nanofibers at a low water retention degree are easily dewatered, so that dewaterability of a cellulose fiber slurry may be improved.

The enzyme treatment, acid treatment, or oxidation treatment of the raw material pulp causes decomposition of the amorphous region of hemicellulose and cellulose in the pulp, which may reduce energy required for making the raw material finer, and improve uniformity and dispersibility of the cellulose fibers. The pretreatment, however, lowers the aspect ratio of cellulose nanofibers, and it is thus preferred to avoid excessive pretreatment for the purpose of enhancing the strength of a recycled resin.

The defibration of the raw material pulp may be performed by beating the raw material pulp in, for example, beaters, homogenizers, such as high-pressure homogenizers and high-pressure homogenizing apparatus, millstone friction machines, such as grinders and mills, single-screw kneaders, multi-screw kneaders, kneaders, refiners, and jet mills. It is preferred to use refiners or jet mills.

The defibration of the raw material pulp is preferably performed so that the desired values or evaluations to be discussed below are achieved in average fiber diameter, average fiber length, water retention degree, degree of crystallinity, and peak value of pseudo particle size distribution of the resulting cellulose nanofibers, pulp viscosity, and B-type viscosity of the dispersion.

The average fiber diameter (average fiber width, or average of diameters of single fibers) of the cellulose nanofibers is preferably 3 to 100 nm, more preferably 10 to 80 nm, particularly preferably 20 to 60 nm. With an average fiber diameter of the cellulose nanofibers below 3 nm, the fiber structure may not be maintained, and sufficient reinforcing effect on resins may not be obtained. Further, in an embodiment wherein the cellulose nanofibers are mixed with a dispersant, the dispersant may not sufficiently cover (cling to) the cellulose nanofibers, resulting in insufficient effect for improving redispersibility in resins. On the other hand, with an average fiber diameter of the cellulose nanofibers over 100 nm, the number of cellulose single crystals contained in one cellulose nanofiber may be increased, which may lead to a lower reinforcing effect.

The average fiber diameter of the cellulose nanofibers may be adjusted by, for example, selection, pretreatment, or defibration of the raw material pulp.

The average fiber diameter of the cellulose nanofibers may be determined by the following process.

First, 100 ml of an aqueous dispersion of cellulose nanofibers having a solid concentration of 0.01 to 0.1 mass % is filtered through a TEFLON (registered trademark) membrane filter, and subjected to solvent substitution once with 100 ml of ethanol and three times with 20 ml of t-butanol. Then the resulting mass is lyophilized and coated with osmium to obtain a sample. An electron microscopic SEM image of this sample is observed at a magnification of 3000 to 30000 folds, depending on the width of the constituent fibers. Specifically, two diagonal lines are drawn on the observation image, and three arbitrary straight lines passing the intersection of the diagonals are drawn. Then, the widths of a total of 100 fibers crossing these three straight lines are visually measured. The median diameter of the measured values is taken as the average fiber diameter.

The average fiber length (lengths of single fibers) of the cellulose nanofibers is preferably 0.1 to 1000 μm, more preferably 0.5 to 500 μm, particularly preferably 1 to 100 μm. With an average fiber length below 0.1 μm, the cellulose nanofibers may not be able to form three-dimensional networks among them, resulting in poor reinforcing effect. With an average fiber length over 1000 μm, the cellulose nanofibers tend to be entangled, and the redispersibility may not be improved sufficiently.

The average fiber length of the cellulose nanofibers may be adjusted by, for example, selection, pretreatment, or defibration of the raw material pulp.

The average fiber length of the cellulose nanofibers may be measured by visually measuring the length of each fiber in the same manner as for the average fiber diameter. The median length of the measured values is taken as the average fiber length.

The water retention degree of the cellulose nanofibers is preferably 250 to 500%, more preferably 280 to 490%, particularly preferably 300 to 480%. With a water retention degree below 250%, the cellulose nanofibers may have poor dispersibility, and may not be mixed homogeneously with other fibers, such as pulp. With a water retention degree over 500%, the water retention degree of the cellulose nanofibers per se is too high, which may impair the dewaterability of the cellulose fiber slurry.

The water retention degree of the cellulose nanofibers may be adjusted by, for example, selection, pretreatment, or defibration of the raw material pulp.

The water retention degree of the cellulose nanofibers is a value determined in accordance with JAPAN TAPPI No. 26: 2000.

The degree of crystallinity of the cellulose nanofibers is preferably 95 to 50%, more preferably 90 to 60%, particularly preferably 85 to 70%. With the degree of crystallinity of the cellulose nanofibers within the above range, the strength of a recycled resin is securely improved.

The degree of crystallinity may arbitrarily be adjusted by, for example, selection, pretreatment, or defibration of the raw material pulp.

The degree of crystallinity of cellulose nanofibers is a value determined in accordance with JIS K 0131 (1996).

The pseudo particle size distribution curve of the cellulose nanofibers preferably has one peak value. With one peak, the cellulose nanofibers have high uniformity in fiber length and fiber diameter, and provide excellent dewaterability of the cellulose fiber slurry.

The peak value of the cellulose nanofibers is, for example, 0.1 to 100 μm, preferably 1 to 50 μm, more preferably 5 to 25 μm.

The peak value of the cellulose nanofibers may be adjusted by, for example, selection, pretreatment, or defibration of the raw material pulp.

The peak value of the cellulose nanofibers is a value determined in accordance with ISO-13320 (2009). More specifically, first, a volume-based particle size distribution of an aqueous dispersion of the cellulose nanofibers is determined using a particle size distribution measuring apparatus. Then the median diameter of the cellulose nanofibers is determined from this distribution, and this median diameter is taken as the peak value.

The pulp viscosity of the cellulose nanofibers is preferably 10.0 to 1.0 cps, more preferably 8.0 to 1.5 cps, particularly preferably 5.0 to 2.0 cps. The pulp viscosity is a viscosity of a solution of cellulose dissolved in a copper-ethylenediamine solution, and a higher pulp viscosity indicates a higher degree of polymerization of cellulose. With a pulp viscosity within the above range, dewaterability may be imparted to the slurry while decomposition of the cellulose nanofibers during kneading with a recycled resin may be suppressed, to thereby achieve sufficient reinforcing effect.

The pulp viscosity of the cellulose nanofibers is a value determined in accordance with TAPPI T 230.

The cellulose nanofibers obtained by the defibration may be dispersed in an aqueous medium and kept in the form of a dispersion, as needed, prior to mixing with other cellulose fibers. It is particularly preferred that the aqueous medium is entirely water (aqueous solution). However, part of the aqueous medium may be another liquid compatible with water. Such another liquid may be, for example, a lower alcohol having 3 or less carbon atoms.

The B-type viscosity of the dispersion of the cellulose nanofibers (1% concentration) is preferably 2000 cps to 10 cps, more preferably 1500 to 30 cps, particularly preferably 1300 to 50 cps. With the B-type viscosity of the dispersion within the above range, mixing with other cellulose fibers may be facilitated, and the dewaterability of the cellulose fiber slurry may be improved.

The B-type viscosity of the dispersion of the cellulose nanofibers (1% solid concentration) is a value determined in accordance with JIS-Z8803: 2011 "Method for viscosity measurement of liquid". A B-type viscosity is a resistant torque in stirring a dispersion, and a higher value indicates more energy required for stirring.

The content of the cellulose nanofibers in the cellulose fibers is preferably less than 50 mass %, more preferably less than 30 mass %, particularly preferably 0 mass %. With the content of the cellulose nanofibers over 50 mass %, the cellulose nanofibers may firmly aggregate and may not be dispersed in a recycled resin, providing insufficient reinforcing effect.

(Microfiber Cellulose)

In the present embodiment, as the fine fibers, microfiber cellulose may be used in place of or in addition to the cellulose nanofibers and, preferably, only the microfiber cellulose may be used.

Microfiber cellulose is larger in size than cellulose nanofibers, and thus easier to be dispersed in a recycled resin to form three-dimensional networks, whereas cellulose nanofibers are closer to single crystalline body than microfiber cellulose, and thus have higher strength properties and are expected to have reinforcing effect on a recycled resin. For taking advantage of the both, it is desirable to mix the two at the above-mentioned percentage.

Microfiber cellulose refers to the fibers having a larger average fiber diameter than that of cellulose nanofibers, specifically, for example, 0.1 to 15 μm, preferably 0.5 to 10 μm, more preferably 1 to 5 μm.

With an average fiber diameter below 0.1 μm, the microfiber cellulose differs nothing from the cellulose nanofibers, and sufficient effect to improve the strength (in particular, flexural modulus) of a recycled resin may not be obtained. Also, a longer time is required for defibration, which in turn requires more energy. Further, the average fiber diameter below 0.1 μm impairs dewaterability of the cellulose fiber slurry. With such an impaired dewaterability, a high amount of energy is required for drying after the cellulose fiber slurry is mixed with a dispersant, which in turn causes thermal deterioration of the microfiber cellulose to impair its strength. On the other hand, with an average fiber diameter over 15 μm, the microfiber cellulose differs nothing from pulp, and sufficient reinforcing effect may not be obtained.

The microfiber cellulose may be obtained by defibrating (making finer) raw material pulp. The raw material pulp may be and may preferably be the same as for the cellulose nanofibers.

The raw material pulp for the microfiber cellulose may be pretreated or defibrated in the same manner as for the cellulose nanofibers. However, the degree of defibration is different, and the defibration should be performed so that the average fiber diameter remains, for example, within the range of 0.1 μm or larger. Explanations will be made below mainly on the differences from the cellulose nanofibers.

The average fiber length (average of lengths of single fibers) of the microfiber cellulose is preferably 0.02 to 3.0 mm, more preferably 0.05 to 2.0 mm, particularly preferably 0.1 to 1.5 mm. With an average fiber length below 0.02 mm, the fibers may not be able to form three-dimensional networks among them, which causes poor reinforcing effect on a recycled resin.

The average fiber length may arbitrarily be adjusted by, for example, selection, pretreatment, or defibration of the raw material pulp.

Preferably 60% or more, more preferably 70% or more, particularly preferably 75% or more of the microfiber cellulose have a fiber length of 0.2 mm or shorter. Below 60%, sufficient reinforcing effect on a recycled resin may not be obtained. On the other hand, there is no upper limit of the percentage of the microfiber cellulose having a fiber length of 0.2 mm or shorter, and all of the microfiber cellulose may have a fiber length of 0.2 mm or shorter.

The aspect ratio of the microfiber cellulose is preferably 2 to 5000, more preferably 100 to 1000. An aspect ratio is a value obtained by dividing an average fiber length by an average fiber width. A larger aspect ratio causes a larger number of locations on the fibers to be caught in a recycled resin, which enhances the reinforcing effect but, on the other hand, is assumed to result in lower ductility of the recycled resin. Incidentally, it is known that, when an inorganic filler is added and kneaded with a recycled resin, a larger aspect ratio of the filler improves more the bending strength, but significantly impairs the elongation.

The percentage of fibrillation of the microfiber cellulose is preferably 1.0 to 30.0%, more preferably 1.5 to 20.0%, particularly preferably 2.0 to 15.0%. With a percentage of fibrillation over 30.0%, the area of contact with water is too large, which may make the dewatering difficult even when the defibration results in the average fiber width within a range of 0.1 μm or larger. With a percentage of fibrillation below 1.0%, hydrogen bonding among the fibrils may be too little to form firm three-dimensional networks.

The degree of crystallinity of the microfiber cellulose is preferably 50% or higher, more preferably 60% or higher. With a degree of crystallinity below 50%, the mixability with pulp or cellulose nanofibers may be improved, whereas the strength of the fibers per se may be lowered to make it difficult to ensure the strength.

On the other hand, the degree of crystallinity of the microfiber cellulose is preferably 90% or lower, more preferably 88% or lower, particularly preferably 86% or lower. With a degree of crystallinity over 90%, the ratio of firm hydrogen bonding within the molecules is high, which makes the fibers themselves rigid and impairs redispersibility.

The degree of crystallinity of the microfiber cellulose may arbitrarily be adjusted by, for example, selection, pretreatment, or defibration of the raw material pulp.

The pulp viscosity of the microfiber cellulose is preferably 2 cps or higher, more preferably 4 cps or higher. With a pulp viscosity below 2 cps, aggregation of the microfiber cellulose may not be reduced sufficiently.

The freeness of the microfiber cellulose is preferably 500 cc or less, more preferably 300 cc or less, particularly preferably 100 cc or less. With a freeness of the microfiber cellulose over 500 cc, the average fiber diameter of the microfiber cellulose exceeds 10 μm, and sufficient effect associated with the strength may not be obtained.

The water retention degree of the microfiber cellulose may arbitrarily be adjusted by, for example, selection, pretreatment, or defibration of the raw material pulp.

The content of the microfiber cellulose in the cellulose fibers is preferably 50 mass % or more, more preferably 70 mass % or more, particularly preferably 100 mass %. With a content of the microfiber cellulose below 50 mass %, the content of the cellulose nanofibers is relatively increased, and the effect resulting from the inclusion of the microfiber cellulose may not be obtained.

Various physical properties of the microfiber cellulose may be determined in the same manner as for the cellulose nanofibers, unless otherwise described.

(Slurry)

The cellulose fibers containing the fine fibers are dispersed in an aqueous medium to prepare a dispersion (slurry), as needed. The aqueous medium is particularly preferably water in its entirety, but an aqueous medium partly containing another liquid compatible with water may also be used. Such another liquid may be, for example, a lower alcohol having 3 or less carbon atoms.

The solid concentration of the slurry is preferably 0.5 to 5.0 mass %, more preferably 1.0 to 3.0 mass %. With a solid concentration below 0.5 mass %, an excessive amount of energy may be required for dewatering and drying. With a solid concentration over 5.0 mass %, the fluidity of the slurry per se may be too low to homogeneously admix with a dispersant.

(Dispersant)

A dispersant may be mixed in the slurry of the cellulose fibers. The dispersant may be at least one additive selected from the group consisting of polybasic acids, derivatives of polybasic acids, polybasic acid salts, and derivatives of polybasic acid salts. As the additive like polybasic acids, one or more members may be selected and used from the group consisting of, for example, oxalic acids, phthalic acids, malonic acids, succinic acids, glutaric acids, adipic acids, tartaric acids, glutamic acids, sebacic acids, hexafluorosilicic acids, maleic acids, itaconic acids, citraconic acids, and citric acids. It is preferred to use at least one of phthalic acid, phthalates, and derivatives thereof (phthalic acids). Examples of the phthalic acids (including derivatives thereof) may include phthalic acid, potassium hydrogen phthalate, sodium hydrogen phthalate, sodium phthalate, ammonium phthalate, dimethyl phthalate, diethyl phthalate, diallyl phthalate, diisobutyl phthalate, dinormal hexyl phthalate, dioctyl phthalate, diisononyl phthalate, diisodecyl phthalate, and ditriisodecyl phthalate. It is preferred to use phthalic acid, and more preferred to use phthalates. In particular, the above-mentioned polybasic acid salts suppress coloring of the resulting resin composition and foaming at higher temperatures. In addition, the polybasic acid salts easily mix well with both cellulose and recycled resins, so that the reinforcing effect on a recycled resin may further be improved. Thus, the fine fibers are securely dispersed (redispersed) in a recycled resin in kneading the two. Further, the dispersant discussed above also has a role in improving compatibility between the fine fibers and a recycled resin, which also improves dispersibility of the fine fibers in the recycled resin. In this regard, the dispersant may also be referred to as a compatibilizer.

(Modification Treatment)

The cellulose fibers may also be modified. Such modification may be, for example, oxidation, etherification, phosphite-modification, esterification, silane coupling, fluorination, cationization, or carbamation. In particular, carbamation is preferred for imparting excellent dispersibility in and affinity to resins.

It is also conceivable, in kneading the cellulose fibers and a recycled resin, to add a separate compatibilizer (agent), but mixing the cellulose fibers and the dispersant (agent) in advance as in the present embodiment, rather than adding the agent at this stage, results in more uniform clinging of the agent over the cellulose fibers, to thereby enhance the effect to improve the compatibility with a recycled resin.

In addition, as the melting point of polypropylene, for example, is 160° C., it is preferred to knead the cellulose fibers and a recycled resin at about 180° C. In this state, the dispersant (liquid), if added, will be dried instantaneously. In this regard, there is known to prepare a masterbatch (a composite resin containing a high concentration of CNF or the like) using a recycled resin with a lower melting point, and then add a recycled resin with an ordinary melting point to the masterbatch to lower the concentration of the cellulose fibers. However, since recycled resins with a lower melting point are generally lower in strength, the strength of the resulting composite resin may be lower according to this method.

The amount of the dispersant to be mixed is preferably 0.1 to 1000 parts by mass, more preferably 1 to 500 parts by mass, particularly preferably 10 to 200 parts by mass based on 100 parts by mass of the cellulose fibers. With the amount of the polybasic acid salts below 0.1 parts by mass, sufficient reinforcing effect may not be achieved. With the amount of the polybasic acid salts over 1000 parts by mass, the reinforcing effect plateaus.

On the other hand, in view of the fact that a dispersant improves the dispersibility of cellulose fibers, mixing of a dispersant should improve the reinforcing effect of cellulose fibers on recycled resins. However, in the presence of cellulose fibers, a dispersant must be hydrophilic (having hydrophilic groups), and consequently lowers the strength of recycled resins on the other hand. Further, a dispersant may possibly emerge to the surface with the lapse of time. Accordingly, the reduction in the mixing amount of a dispersant is a significant advantage.

(Production Method)

The fibrous cellulose to be used in the production may be obtained by beating (defibrating) raw material fibers (pulp fibers). The raw material fibers may be one or more fibers selected from the group consisting of, for example, plant-derived fibers, animal-derived fibers, and microorganism-derived fibers. It is particularly preferred to use plant-derived pulp fibers as the raw material fibers in view of their low cost and thermal recycling.

In the subsequent kneading step, the obtained cellulose fibers are mixed with at least one of resin powders and resin pellets to obtain a mixture (the first mixture recited in the claims). Method for obtaining the first mixture includes kneading at least one of resin powders and resin pellets into cellulose fibers to obtain a mixture. Then, this mixture may be kneaded with a recycled resin. Other kneading method may include mixing, at least one of resin powders and resin pellets into a slurry of cellulose fibers to obtain a first mixture (the first mixture recited in the claims), mixing a recycled resin into the first mixture to obtain a second mixture (the second mixture recited in the claims), and kneading the second mixture.

The mixing ratio of the at least one of resin powders and resin pellets to a recycled resin may be as follows. With respect to 50 parts by mass of a recycled resin, the lower limit of the amount of the at least one of resin powders and resin pellets is more than 0 parts by mass, preferably 10 parts by mass or more, more preferably 30 parts by mass or more, whereas the upper limit of the amount is 100 parts by mass or less, preferably 90 parts by mass or less, more preferably 50 parts by mass or less. With the amount of the at least one of resin powders and resin pellets being 0, the inherent strength of the virgin resin is not imparted to the eventually obtained cellulose fiber composite recycled resin, and the desired strength is not achieved. With the upper limit of the amount over 100 parts by mass, the ratio of the recycled resin in the eventually obtained cellulose fiber composite recycled resin is too low, leading to little advantage of recycling the recycled resin.

The ratio of the resin powders and the resin pellets is not particularly limited and may be as follows.

$$\text{Amount of resin powders:Amount of resin pellets}=a:100-a$$

wherein a represents a number of more than 0 and 100 or less.

For example, the ratio of the amount of resin powders to the amount of resin pellets may be 0:100, 10:90, 50:50, 90:10, or 100:0.

The at least one of resin powders and resin pellets and the recycled resin may be the same or different types of resins. In an example wherein the resins are not of the same type, the resin powders may be polyethylene, the resin pellets may be a phenol resin, and the recycled resin may be a hydroxy-carboxylic polymer. On the other hand, in an example wherein the resins are of the same type, each of the resin powders, the resin pellets, and the recycled resin may be a polycarbonate resin. With all of the resin powders, the resin pellets, and the recycled resin being of the same type, chemical properties (melting point, molecular composition, or the like) are almost the same, so that the production process may advantageously be simplified. Here, the "type" refers to the resin type, and the resins may be selected from, for example, those classified into thermoplastic resins, thermosetting resins, or the like, as will be discussed.

It is preferred that the mixture of the cellulose fibers and the at least one of resin powders and resin pellets is dried and ground into a powdered product prior to the kneading with a recycled resin. According to this embodiment, no drying of the cellulose fibers is needed prior to the kneading with a recycled resin, which is thermally efficient. Further, where the dispersant is already in the mixture, the fine fibers are less likely to be unredispersible after the mixture is dried.

In mixing the cellulose fibers and the resin powders, the cellulose fibers may be subjected to chemical hydrophobic modification with an agent. The chemical hydrophobic modification may be, for example, esterification, etherification, amidation, or sulfidation. Chemical hydrophobic modification by esterification is particularly preferred. By the chemical hydrophobic modification, the strength of the final molded product is enhanced.

For esterification of the cellulose fibers, known agents may suitably be used, for example, at least one substance selected from the group consisting of polybasic acids, polybasic acid salts, derivatives of polybasic acids, derivatives of polybasic acid salts, and anhydrides thereof. An example of the agent may be at least one substance selected from the group consisting of phthalic acid, phthalates, derivatives of phthalic acid, derivatives of phthalates, and anhydrides thereof. The polybasic acid anhydride, for example, may be maleic anhydride, phthalic anhydride, itaconic anhydride, citraconic anhydride, or citric anhydride, and one or more of these may be selected and used. Preferably maleic anhydride, more preferably phthalic anhydride may be used.

Incidentally, a difference in solubility parameter $(cal/cm^3)^{1/2}$ (i.e., SP value) between the cellulose fibers and the recycled resin or pulp fibers may be represented by the following formula:

$$(\text{Difference in } SP \text{ value}) = (SP_{MFC} \text{ value of cellulose fibers}) - (SP_{POL} \text{ value of recycled resin})$$

The mixture is dehydrated into a dehydrated product, as needed, prior to drying. For the dehydration, one or more dehydrators may be selected and used from the group consisting of, for example, belt presses, screw presses, filter presses, twin rolls, twin wire formers, valveless filters, center disk filters, film treatment units, and centrifuges.

Drying of the mixture may be performed using one or more means selected from the group consisting of, for example, rotary kiln drying, disk drying, air flow drying, medium fluid drying, spray drying, drum drying, screw conveyor drying, paddle drying, single-screw kneading drying, multi-screw kneading drying, vacuum drying, and stirring drying.

The dried mixture (dried product) is pulverized into a powdered product. For pulverizing the dried product, one or more means may be selected and used from the group consisting of, for example, bead mills, kneaders, dispersers, twist mills, cut mills, and hammer mills.

The average particle size of the powdered product is preferably 1000 µm or smaller, more preferably 800 µm or smaller, particularly preferably 600 µm or smaller. With an average particle size over 1000 µm, the powdered product may have inferior kneadability with a recycled resin. Making the average particle size of the powdered product smaller than 1 µm requires a high amount of energy, which is not economical. The average particle size of the powdered product may be controlled by regulating the degree of pulverization, or by classification in classification apparatus, such as filters or cyclones.

The bulk specific gravity of the mixture (powdered product) is preferably 0.03 to 1.0, more preferably 0.1 to 0.8. A bulk specific gravity exceeding 1.0 means the bonding among the cellulose fibers being still firmer, so that dispersion in a recycled resin is not easy. A bulk specific gravity less than 0.03 is disadvantageous in view of transportation cost.

The bulk specific gravity is a value determined in accordance with JIS K7365.

The moisture percentage of the mixture (powdered product) is preferably 50% or lower, more preferably 30% or lower, particularly preferably 10% or lower. With a moisture percentage over 50%, a significant amount of energy is required for kneading with a recycled resin, which is not economical.

The moisture percentage of fibers is a value determined by holding a sample at 105° C. for 6 hours or longer in a constant temperature dryer until change in mass is not observed and measuring the mass as a mass after drying, and calculated by the following formula:

$$\text{Moisture percentage of fibers}(\%) =$$
$$[(\text{mass before drying} - \text{mass after drying})/\text{mass before drying}] \times 100$$

The powdered product thus obtained is kneaded with a recycled resin, to thereby obtain the cellulose fiber composite recycled resin. The kneading may be performed by, for example, mixing a recycled resin in the form of pellets with the powdered product, or by first melting a recycled resin to obtain a molten product and then mixing the powdered product into the molten product.

The resin in each of the resin powders, the recycled resin, and the virgin resin may either be a thermoplastic resin or a thermosetting resin.

As a thermoplastic resin, one or more resins may be selected and used from the group consisting of, for example, polyolefins, such as polypropylene (PP) and polyethylene (PE), polyester resins, such as aliphatic polyester resins and aromatic polyester resins, polystyrenes, polyacrylic resins, such as polymethacrylates, and polyacrylates, polyamide resins, polycarbonate resins, and polyacetal resins.

It is preferred, however, to use at least either one of polyolefins and polyester resins. Polyolefins may preferably be polypropylenes. Polyester resins may be aliphatic polyester resins, such as polylactic acid or polycaprolactone, or aromatic polyester resins, such as polyethylene terephthalate, and preferably biodegradable polyester resins (also referred to simply as "biodegradable resins") may be used.

As a biodegradable resin, one or more members may be selected and used from the group consisting of, for example, hydroxycarboxylic acid-based aliphatic polyesters, caprolactone-based aliphatic polyesters, and dibasic acid polyesters.

As a hydroxycarboxylic acid-based aliphatic polyester, one or more members may be selected and used from the group consisting of, for example, homopolymers of a hydroxycarboxylic acid, such as lactic acid, malic acid, glucose acid, or 3-hydroxybutyric acid, and copolymers using at least one of these hydroxycarboxylic acids. It is preferred to use polylactic acid, a copolymer of lactic acid and any of the hydroxycarboxylic acids other than lactic acid, polycaprolactone, and particularly preferred to use polylactic acid.

The lactic acid may be, for example, L-lactic acid or D-lactic acid, and a single kind or a combination of two or more kinds of these lactic acids may be used.

As a caprolactone-based aliphatic polyester, one or more members may be selected and used from the group consisting of, for example, homopolymers of caprolactone, and copolymers of caprolactone or the like and any of the hydroxycarboxylic acids mentioned above.

As a dibasic acid polyester, one or more members may be selected and used from the group consisting of, for example, polybutylene succinates, polyethylene succinates, and polybutylene adipates.

A single kind or a combination of two or more kinds of the biodegradable resins may be used.

Examples of the thermosetting resins may include, for example, phenol resins, urea resins, melamine resins, furan resins, unsaturated polyesters, diallyl phthalate resins, vinyl ester resins, epoxy resins, polyurethane-based resins, silicone resins, and thermosetting polyimide-based resins. A single kind or a combination of two or more kinds of these resins may be used.

The resin powders, the recycled resin, and the virgin resin may contain an inorganic filler, preferably at a rate that does not disadvantageously affect thermal recycling.

Examples of the inorganic filler may include, for example, simple substances of metal elements belonging to Groups I to VIII of the Periodic Table, such as Fe, Na, K, Cu, Mg, Ca, Zn, Ba, Al, Ti, or a silicon element; oxides thereof, hydroxides thereof, carbonates thereof, sulfates thereof, silicates thereof, or sulfites thereof; and various clay minerals formed of these compounds.

Specific examples of the inorganic filler may include, for example, barium sulfate, calcium sulfate, magnesium sulfate, sodium sulfate, calcium sulfite, zinc oxide, silica, heavy calcium carbonate, light calcium carbonate, aluminum borate, alumina, iron oxide, calcium titanate, aluminum hydroxide, magnesium hydroxide, calcium hydroxide, sodium hydroxide, magnesium carbonate, calcium silicate, clay wollastonite, glass beads, glass powder, silica sand, silica stone, quartz powder, diatomaceous earth, white carbon, and glass fibers. A plurality of these inorganic fillers may be contained. The inorganic filler may be one contained in de-inked pulp.

The mixing ratio of the cellulose fibers and the recycled resin is preferably 1 part by mass or more of the cellulose fibers to 80 parts by mass or less of the recycled resin, more preferably 2 parts by mass or more of the cellulose fibers to 75 parts by mass or less of the recycled resin, particularly preferably 3 parts by mass or more of the cellulose fibers to 70 parts by mass or less of the recycled resin.

Further, the ratio is preferably 10 parts by mass or less of the cellulose fibers to 30 parts by mass or more of the recycled resin, more preferably 9 parts by mass or less of the cellulose fibers to 40 parts by mass or more of the recycled resin, particularly preferably 8 parts by mass or less of the cellulose fibers to 50 parts by mass or more of the recycled resin. With 5 to 10 parts by mass of the cellulose fibers, the strength, in particular the bending strength and the tensile elastic modulus, of the cellulose fiber composite recycled resin may significantly be improved.

It is noted that the ratio of the cellulose fibers and the recycled resin contained in the eventually obtained composite recycled resin is usually the same as the mixing ratio of the cellulose fibers and the recycled resin mentioned above.

(Other Components)

The composition of the composite recycled resin may contain or may be caused to contain, in addition to the fine fibers, pulp, and the like discussed above, fibers derived from plant materials obtained from various plants, such as kenaf, jute hemp, manila hemp, sisal hemp, ganpi, mitsumata, mulberry, banana, pineapple, coconut, corn, sugar cane, bagasse, palm, papyrus, reed, esparto, survival grass, wheat, rice, bamboo, various kinds of softwood (cedar, cypress, and the like), hardwood, and cotton.

To the composition of the composite recycled resin, one or more members selected from the group consisting of, for example, antistatic agents, flame retardants, antibacterial agents, colorants, radical scavengers, and foaming agents may be added without disturbing the effects of the present invention. These materials may be added to the dispersion of the cellulose fibers, added while the mixture and a recycled resin are kneaded, added to the resulting kneaded product, or added otherwise. In view of the manufacturing efficiency, the materials may preferably be added while the mixture and a recycled resin are kneaded.

(Molding Treatment)

The kneaded product of the mixture and a recycled resin may be molded into a desired shape, following another kneading, if necessary. The size, thickness, shape, and the like of the molded product are not particularly limited, and the molded product may be in the form of, for example, sheets, pellets, powders, or fibers.

The temperature during the molding treatment is at or higher than the glass transition point of the recycled resin, and may be, for example, 100 to 300° C., preferably 160 to 200° C., depending on the type of the recycled resin.

The kneaded product may be molded, for example, by die molding, injection molding, extrusion molding, hollow molding, or foam molding. The kneaded product may be spun into a fibrous shape, mixed with the above-mentioned plant materials or the like, and molded into a mat shape or a board shape. This mixing may be performed by, for example, simultaneous deposition by air-laying.

As a machine for molding the kneaded product, one or more machines may be selected and used from the group consisting of, for example, an injection molding machine, a blow molding machine, a hollow molding machine, a compression molding machine, an extrusion molding machine, a vacuum molding machine, and a pressure molding machine.

The molding discussed above may be performed following the kneading, or by first cooling the kneaded product, chipping the cooled product in a crusher or the like, and then introducing the resulting chips in a molding machine, such as an extrusion molding machine or an injection molding machine. It is noted that the molding is not an essential requirement of the present invention.

EXAMPLES

Next, operation procedures in Examples of the present invention will be discussed. The polypropylene pellets to be discussed below are made of a resin mainly composed of non-recycled polypropylene. The polypropylene powders are prepared by powderizing this polypropylene.

Example 1

(1) Into 384 g of an aqueous dispersion of microfiber cellulose having a solid concentration of 2.6 mass %, 11 g of potassium hydrogen phthalate and 76 g of polypropylene powders having an average particle size of 136 μm were added, and dried under heating at 105° C. to obtain a fine cellulose fiber mixture. The moisture content of the obtained fine cellulose fiber mixture was less than 10%. The microfiber cellulose used here had an average fiber length of 0.17 mm.

(2) To this fine cellulose fiber mixture, 3 g of maleic anhydride-modified polypropylene (MAPP) were added and kneaded at 180° C. in a twin-screw kneader at 200 rpm to obtain a microfiber cellulose composite resin.

(3) This microfiber cellulose composite resin was cut in a pelleter into microfiber cellulose composite resin pellets in the form of a cylinder (2 mm in diameter, 2 mm in height).

(4) The microfiber cellulose composite resin pellets and a recycled resin, at a ratio of microfiber cellulose composite resin pellets:recycled resin=1:1, were kneaded at 180° C. in a twin-screw kneader at 200 rpm to obtain a kneaded product.

(5) This kneaded product was cut in a pelleter into cylinders (2 mm in diameter, 2 mm in height), and injection molded at 180° C. into a cuboid test piece (59 mm long, 9.6 mm wide, 3.8 mm thick).

Example 2

(1) Into 192 g of an aqueous dispersion of microfiber cellulose having a solid concentration of 2.6 mass %, 5.5 g of potassium hydrogen phthalate, 38 g of polypropylene powders having an average particle size of 136 μm, and 50 g of a recycled resin were added, and dried under heating at 105° C. to obtain a fine cellulose fiber mixture. The moisture content of the obtained fine cellulose fiber mixture was less than 10%.

(2) To this fine cellulose fiber mixture, 1.5 g of maleic anhydride-modified polypropylene were added and kneaded at 180° C. in a twin-screw kneader at 200 rpm to obtain a microfiber cellulose composite resin.

(3) This microfiber cellulose composite resin was cut in a pelleter into cylinders (2 mm in diameter, 2 mm in height), and injection molded at 180° C. into a cuboid test piece (59 mm long, 9.6 mm wide, 3.8 mm thick).

Example 3

(1) Into 192 g of an aqueous dispersion of microfiber cellulose having a solid concentration of 2.6 mass %, 5.5 g of potassium hydrogen phthalate, 28 g of polypropylene powders having an average particle size of 136 μm, 50 g of a recycled resin, and 10 g of polypropylene pellets having an average particle size of 3 mm were added, and dried under heating at 105° C. to obtain a fine cellulose fiber mixture. The moisture content of the obtained fine cellulose fiber mixture was less than 10%.

(2) To this fine cellulose fiber mixture, 1.5 g of maleic anhydride-modified polypropylene were added and kneaded at 180° C. in a twin-screw kneader at 200 rpm to obtain a microfiber cellulose composite resin.

(3) This microfiber cellulose composite resin was cut in a pelleter into cylinders (2 mm in diameter, 2 mm in height), and injection molded at 180° C. into a cuboid test piece (59 mm long, 9.6 mm wide, 3.8 mm thick).

Example 4

(1) Into 192 g of an aqueous dispersion of microfiber cellulose having a solid concentration of 2.6 mass %, 5.5 g of potassium hydrogen phthalate, 18 g of polypropylene powders, 50 g of a recycled resin, and 20 g of polypropylene pellets were added, and dried under heating at 105° C. to obtain a fine cellulose fiber mixture. The moisture content of the obtained fine cellulose fiber mixture was less than 10%.

(2) To this fine cellulose fiber mixture, 1.5 g of maleic anhydride-modified polypropylene were added and kneaded at 180° C. in a twin-screw kneader at 200 rpm to obtain a microfiber cellulose composite resin.

(3) This microfiber cellulose composite resin was cut in a pelleter into cylinders (2 mm in diameter, 2 mm in height), and injection molded at 180° C. into a cuboid test piece (59 mm long, 9.6 mm wide, 3.8 mm thick).

Example 5

(1) Into 192 g of an aqueous dispersion of microfiber cellulose having a solid concentration of 2.6 mass %, 5.5 g of potassium hydrogen phthalate, 8 g of polypropylene powders, 50 g of a recycled resin, and 30 g of polypropylene pellets were added, and dried under heating at 105° C. to obtain a fine cellulose fiber mixture. The moisture content of the obtained fine cellulose fiber mixture was less than 10%.

(2) To this fine cellulose fiber mixture, 1.5 g of maleic anhydride-modified polypropylene were added and kneaded at 180° C. in a twin-screw kneader at 200 rpm to obtain a microfiber cellulose composite resin.

(3) This microfiber cellulose composite resin was cut in a pelleter into cylinders (2 mm in diameter, 2 mm in height), and injection molded at 180° C. into a cuboid test piece (59 mm long, 9.6 mm wide, 3.8 mm thick).

Example 6

(1) Into 192 g of an aqueous dispersion of microfiber cellulose having a solid concentration of 2.6 mass %, 5.5 g of potassium hydrogen phthalate, 50 g of a recycled resin, and 38 g of polypropylene pellets were added and dried under heating at 105° C. to obtain a fine cellulose fiber mixture. The moisture content of the obtained fine cellulose fiber mixture was less than 10%.

(2) To this fine cellulose fiber mixture, 1.5 g of maleic anhydride-modified polypropylene were added and kneaded at 180° C. in a twin-screw kneader at 200 rpm to obtain a microfiber cellulose composite resin.

(3) This microfiber cellulose composite resin was cut in a pelleter into cylinders (2 mm in diameter, 2 mm in height), and injection molded at 180° C. into a cuboid test piece (59 mm long, 9.6 mm wide, 3.8 mm thick).

Comparative Example 1

(1) A mixture of 50 g of a recycled resin and 50 g of polypropylene pellets was kneaded at 180° C. in a twin-screw kneader at 200 rpm to obtain a composite resin of the recycled resin and the polypropylene.

(2) This composite resin was cut in a pelleter into cylinders (2 mm in diameter, 2 mm in height), and injection molded at 180° C. into a cuboid test piece (59 mm long, 9.6 mm wide, 3.8 mm thick).

Each composite resin was subjected to determination of the flexural modulus and evaluation by bending test. The results are shown in Table 1.
(Flexural Modulus)

Each composite resin was molded into a bending test specimen, and this molded specimen was subjected to determination of the flexural modulus. The flexural modulus was determined in accordance with JIS K7171: 2008.
(Evaluation by Bending Test)

The result of the bending test was evaluated as "○" (circle mark) where, with reference to the flexural modulus of the recycled resin being 1, the flexural modulus (multiple) of the cellulose fiber composite recycled resin was 1.4 times or more.

The result of the bending test was evaluated as "Δ" (triangle mark) where, with reference to the flexural modulus of the recycled resin being 1, the flexural modulus (multiple) of the cellulose fiber composite recycled resin was 1.2 times or more and less than 1.4 times.

The result of the bending test was evaluated as "x" (cross mark) where with reference to the flexural modulus of the recycled resin being 1, the flexural modulus (multiple) of the cellulose fiber composite recycled resin was less than 1.2 times.

The results of the Examples are shown in Table 1.

TABLE 1

| | Mixing ratio | | | | | | |
|---|---|---|---|---|---|---|---|
| | Microfiber cellulose | Potassium hydrogen phthalate | MAPP | Polypropylene powders | Recycled resin | Polypropylene pellets | Evaluation by bending test |
| Example 1 | 5 | 5.5 | 1.5 | 38 | 50 | 0 | ○ |
| Example 2 | 5 | 5.5 | 1.5 | 38 | 50 | 0 | Δ |
| Example 3 | 5 | 5.5 | 1.5 | 28 | 50 | 10 | Δ |
| Example 4 | 5 | 5.5 | 1.5 | 18 | 50 | 20 | Δ |

TABLE 1-continued

| | Mixing ratio | | | | | | |
|---|---|---|---|---|---|---|---|
| | Microfiber cellulose | Potassium hydrogen phthalate | MAPP | Polypropylene powders | Recycled resin | Polypropylene pellets | Evaluation by bending test |
| Example 5 | 5 | 5.5 | 1.5 | 8 | 50 | 30 | Δ |
| Example 6 | 5 | 5.5 | 1.5 | 0 | 50 | 38 | Δ |
| Comparative Example 1 | 0 | 0 | 0 | 0 | 50 | 50 | x |

In Table 1, the agents are potassium hydrogen phthalate and maleic anhydride-modified polypropylene. The numerical values represent the mixing ratio.

(Others)

In the fiber analysis, the number average fiber diameter and the percentage of the fibers having a fiber length of 0.2 mm or shorter were measured using a fiber analyzer, FS5, manufactured by Valmet K.K.

With regard to the degree of crystallinity, cellulose fibers have amorphous regions and crystalline regions, and the degree of crystallinity refers to the percentage of the crystalline regions in the overall cellulose fibers (the total of the amorphous regions and the crystalline regions).

The pulp viscosity of the microfiber cellulose was determined in accordance with JIS P 8215 (1998). A higher pulp viscosity indicates a higher degree of polymerization of cellulose.

The freeness is a value determined in accordance with JIS P 8121-2: 2021.

The average particle size may be determined in accordance with JIS 28825: 2013.

INDUSTRIAL APPLICABILITY

The present invention is applicable to a cellulose fiber composite recycled resin and a method for producing the same.

The invention claimed is:

1. A method for producing a cellulose fiber composite recycled resin, comprising:
   mixing at least one of resin powders and resin pellets into a slurry of cellulose fibers to obtain a first mixture, and kneading the first mixture with a recycled resin,
   wherein part or all of the cellulose fibers are microfiber cellulose having an average fiber diameter of 0.1 to 15 μm.

2. A method for producing a cellulose fiber composite recycled resin, comprising:
   mixing at least one of resin powders and resin pellets into a slurry of cellulose fibers to obtain a first mixture,
   mixing a recycled resin into the first mixture to obtain a second mixture, and
   kneading the second mixture,
   wherein part or all of the cellulose fibers are microfiber cellulose having an average fiber diameter of 0.1 to 15 μm.

3. The method for producing a cellulose fiber composite recycled resin according to claim 1,
   wherein, with respect to 50 parts by mass of the recycled resin, the at least one of the resin powders and the resin pellets amount to more than 0 parts by mass and 100 parts by mass or less.

4. The method for producing a cellulose fiber composite recycled resin according to claim 1,
   wherein the resin powders have an average particle size of 1 to 1500 μm.

5. The method for producing a cellulose fiber composite recycled resin according to claim 1,
   wherein the resin pellets have an average particle size of 1 to 10 mm.

6. The method for producing a cellulose fiber composite recycled resin according to claim 1,
   wherein a component of the at least one of the resin powders and the resin pellets are the same as a component of the recycled resin.

7. The method for producing a cellulose fiber composite recycled resin according to claim 1, further comprising:
   mixing at least one substance selected from the group consisting of polybasic acids, polybasic acid salts, derivatives of polybasic acids, and derivatives of polybasic acid salts into the slurry.

8. The method for producing a cellulose fiber composite recycled resin according to claim 1, further comprising:
   mixing at least one substance selected from the group consisting of phthalic acid, phthalates, derivatives of phthalic acid, and derivatives of phthalates into the slurry.

9. The method for producing a cellulose fiber composite recycled resin according to claim 1,
   wherein the kneading of the first mixture with the recycled resin follows drying and grinding of the first mixture into a powdered product.

10. A cellulose fiber composite recycled resin, comprising:
    a recycled resin, and
    a mixture of
       microfiber cellulose having an average fiber length of 0.02 to 3 mm and an average fiber diameter of 0.1 to 15 μm,
       at least one of resin powders and resin pellets, and
       at least one substance selected from the group consisting of phthalic acid, phthalates, derivatives of phthalic acid, and derivatives of phthalates.

11. The method for producing a cellulose fiber composite recycled resin according to claim 2,
    wherein, with respect to 50 parts by mass of the recycled resin, the at least one of the resin powders and the resin pellets amount to more than 0 parts by mass and 100 parts by mass or less.

12. The method for producing a cellulose fiber composite recycled resin according to claim 2,
    wherein the resin powders have an average particle size of 1 to 1500 μm.

13. The method for producing a cellulose fiber composite recycled resin according to claim 2, wherein the resin pellets have an average particle size of 1 to 10 mm.

14. The method for producing a cellulose fiber composite recycled resin according to claim 2,
wherein a component of the at least one of the resin powders and the resin pellets are the same as a component of the recycled resin.

15. The method for producing a cellulose fiber composite recycled resin according to claim 2, further comprising:
mixing at least one substance selected from the group consisting of polybasic acids, polybasic acid salts, derivatives of polybasic acids, and derivatives of polybasic acid salts into the slurry.

16. The method for producing a cellulose fiber composite recycled resin according to claim 2, further comprising:
mixing at least one substance selected from the group consisting of phthalic acid, phthalates, derivatives of phthalic acid, and derivatives of phthalates into the slurry.

* * * * *